US012634342B2

(12) United States Patent
Block et al.

(10) Patent No.: US 12,634,342 B2
(45) Date of Patent: May 19, 2026

(54) PHISHING SITE IDENTIFICATION AND SECURITY REMEDY

(71) Applicant: Ramp Business Corporation, New York, NY (US)

(72) Inventors: Eli Benjamin Block, New York, NY (US); Trung Nguyen, San Jose, CA (US)

(73) Assignee: Ramp Business Corporation, New York, NY (US)

( * ) Notice: Subject to any disclaimer, the term of this patent is extended or adjusted under 35 U.S.C. 154(b) by 122 days.

(21) Appl. No.: 18/204,288

(22) Filed: May 31, 2023

(65) Prior Publication Data

US 2024/0406211 A1    Dec. 5, 2024

(51) Int. Cl.
H04L 9/40        (2022.01)
(52) U.S. Cl.
CPC ........ H04L 63/1483 (2013.01); H04L 63/205 (2013.01)
(58) Field of Classification Search
CPC ........................... H04L 63/1483; H04L 63/205
See application file for complete search history.

(56) References Cited

U.S. PATENT DOCUMENTS

| | | | |
|---|---|---|---|
| 2020/0396216 A1* | 12/2020 | Benkreira | ............. G06F 16/986 |
| 2021/0182892 A1* | 6/2021 | Henderson | ......... G06Q 30/0222 |
| 2022/0070216 A1* | 3/2022 | Kohavi | ............... H04L 63/1416 |
| 2022/0174092 A1* | 6/2022 | Farjon | ................... H04L 63/123 |
| 2024/0114053 A1* | 4/2024 | Katz | ................... H04L 63/1483 |

* cited by examiner

*Primary Examiner* — Gil H. Lee
(74) *Attorney, Agent, or Firm* — Fenwick & West LLP

(57)        ABSTRACT

Embodiments are related to determining if an unverified web page is a phishing site of a verified web page. In one or more embodiments, a computing server detects a style sheet element of an unverified web page accessed by a user using a web browser extension. The computing server checks if the detected style sheet element contains a copy of a part of a style sheet element present in the verified web page. If the style sheet element of the unverified web page contains a copy of the part of a style sheet element of the verified web page, indicating that the unverified web page is a phishing site, the computing server takes a security action. In some embodiments, the computing server may check if the unverified web page is a known web page.

20 Claims, 9 Drawing Sheets

500c                        505c                                    520c

300

PHISHING SITE IDENTIFICATION AND SECURITY REMEDY

TECHNICAL FIELD

The present disclosure generally relates to the identification of web pages as phishing sites.

BACKGROUND

Phishing sites are designed to mimic legitimate web pages in an attempt to acquire sensitive data from users who believe the phishing site to be a legitimate web page. When a user provides their log-in information to the phishing site, the phishing site may access sensitive information associated with the user's account, such as the user's contact information or saved payment information.

Many entities with legitimate web pages attempt to protect users of their web page from phishing sites by implementing techniques that allow them to identify sites that may be phishing their users. Oftentimes entities using various conventional phishing detection techniques may face a problem of scale. For example, it is impossible for entities to scan every page on the internet to detect which pages are phishing sites of their legitimate web pages, and it is challenging for entities to know which web pages they should be scanning.

SUMMARY

Embodiments are related to determining if an unverified web page is a phishing site of a verified web page. In one or more embodiments, a computing server detects a style sheet element of an unverified web page accessed by a user using a web browser extension. The computing server checks if the detected style sheet element contains a copy of a part of a style sheet element present in the verified web page. If the style sheet element of the unverified web page contains a copy of the part of a style sheet element of the verified web page, indicating that the unverified web page is likely to be a phishing site, the computing server takes a security action.

BRIEF DESCRIPTION OF THE DRAWINGS

Figure (FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
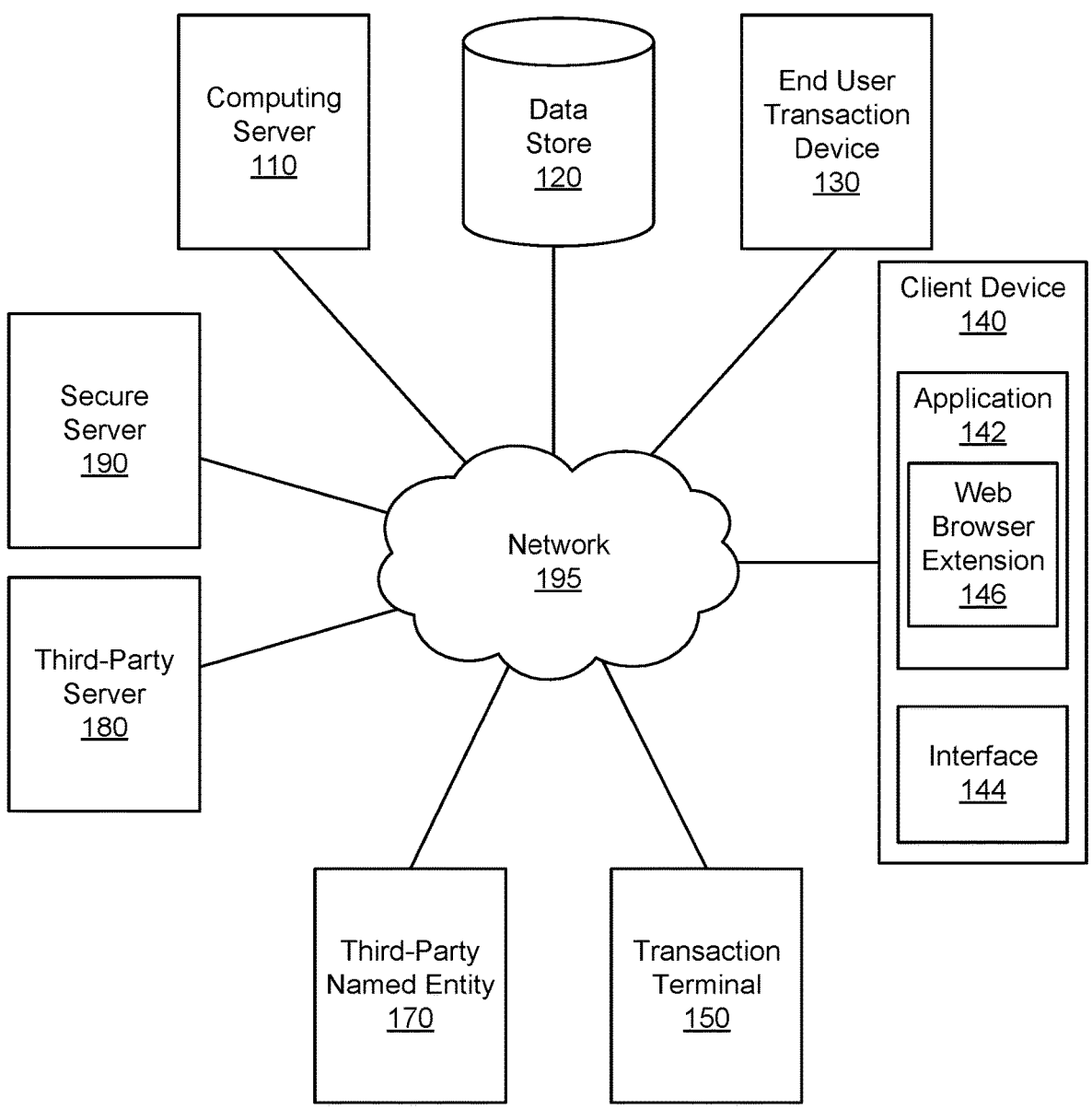

Figure (FIG. 1 is a block diagram that illustrates an automated record matching system environment 100, in accordance with some embodiments. The system environment 100 includes a computing server 110, a data store 120, an end user transaction device 130, a client device 140, a transaction terminal 150, a third-party named entity 170, a third-party server 180, and a secure server 190. The entities and components in the system environment 100 communicate with each other through a network 195. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can communicate with multiple end user transaction devices 130 for different end users, who interact with various third-party named entities 170. Different client devices 140 may also access the computing server 110 simultaneously.

The computing server 110 includes one or more computers that perform various tasks related to managing certain transactions on behalf of clients and automatically matching transactions of various clients to documentation records of those transactions that may be generated in other sources. For example, the computing server 110 may create transaction cards (e.g., credit cards) and accounts for an organization client and manages transactions of the cards based on rules set by the client (e.g., pre-authorization and restrictions on certain transactions). Examples of organizations may include commercial businesses, educational institutions, private or government agencies, or any suitable group of one or more individuals that engage in transactions with a named entity (e.g., a merchant) using an account associated with a transaction card. An end user may be a member of an organization client such as an employee of the organization or an individual that uses transaction cards to make purchase from a merchant. In some embodiments, the computing server 110 provides its clients with various payment, spending, and record matching and management services as a form of cloud-based software, such as software as a service (Saas). Examples of components and functionalities of the computing server 110 are discussed in further detail below with reference to FIG. 2. The computing server 110 may provide a SaaS platform for various clients to manage their accounts and transaction rules related to the accounts.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, documentation records, record verification rules, and other related data associated with various clients of the computing server 110. In various embodiments, the data store 120 may take different forms. In some embodiments, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In some embodiments, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include transaction cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The computing server 110 may be the party that issues the end user transaction devices 130 such as credit cards for its organization clients and may impose spending control rules and restrictions on those cards. While credit cards are often used as examples in the discussion of this disclosure, various architectures and processes described herein may also be applied to other types of end user transaction devices 130. In some cases, an end user transaction device 130 may also be a virtual device such as a virtual credit card.

A client device 140 is a computing device that belongs to a client of the computing server 110 or an end user, such as an employee of an organizational client of the computing server 110. A client uses the client device 140 to communicate with the computing server 110 and performs various payment, spending, and record management related tasks such as creating credit cards and associated payment accounts, setting transaction and record verification rules and restrictions on cards, setting pre-authorized or prohibited merchants or merchant categories (e.g., entertainment, travel, education, health, etc.), and matching transactions and records (e.g., verifying a documentation record). The user of the client device 140 may be a manager, an accounting administrator, or a general employee of an organization. While in this disclosure a client is often described as an organization, a client may also be a natural person or a robotic agent. A client may be referred to an organization or its representative such as its employee.

A client device 140 includes one or more applications 142 and interfaces 144 that may display visual elements of the applications 142. In some embodiments, one example of the application may be a web browser application 142 and its corresponding front-end rendering serving as the interface 144. In some embodiments, the web browser application 142 may include a web browser extension 146 that is installed within the browser as an add-on feature to the browser. The client device 140 may be any computing device. Examples of such client devices 140 include personal computers (PC), desktop computers, laptop computers, tablets (e.g., iPad), smartphones, wearable electronic devices such as smartwatches, or any other suitable electronic devices.

The application 142 is a software application that operates at the client device 140. In some embodiments, an application 142 is published by the party that operates the computing server 110 to allow clients to communicate with the computing server 110. For example, the application 142 may be part of a SaaS platform of the computing server 110 that allows a client to create transaction cards and accounts and perform various payment, spending, and record management tasks (e.g., confirm documentation records have been verified).

In various embodiments, an application 142 may be of different types. In some embodiments, an application 142 is a web application that runs on JavaScript and other backend algorithms. In the case of a web application, the application 142 cooperates with a web browser to render a front-end interface 144. In another embodiment, an application 142 is a mobile application. For example, the mobile application may run on Swift for iOS and other APPLE operating systems or on Java or another suitable language for ANDROID systems. In yet another embodiment, an application 142 may be a software program that operates on a desktop computer that runs on an operating system such as LINUX, MICROSOFT WINDOWS, MAC OS, or CHROME OS.

An interface 144 is a suitable interface for a client to interact with the computing server 110. The client may communicate to the application 142 and the computing server 110 through the interface 144. The interface 144 may take different forms. In some embodiments, the interface 144 may be a web browser such as CHROME, FIREFOX, SAFARI, INTERNET EXPLORER, EDGE, etc. and the application 142 may be a web application that is run by the web browser. In some embodiments, the interface 144 is part of the application 142. For example, the interface 144 may be the front-end component of a mobile application or a desktop application. In some embodiments, the interface 144 also is a graphical user interface (GUI) which includes graphical elements and user-friendly control elements. In some embodiments, the interface 144 does not include graphical elements but communicates with the data store 120 via other suitable ways such as application program interfaces (APIs), which may include conventional APIs and other related mechanisms such as webhooks.

Figure 4:
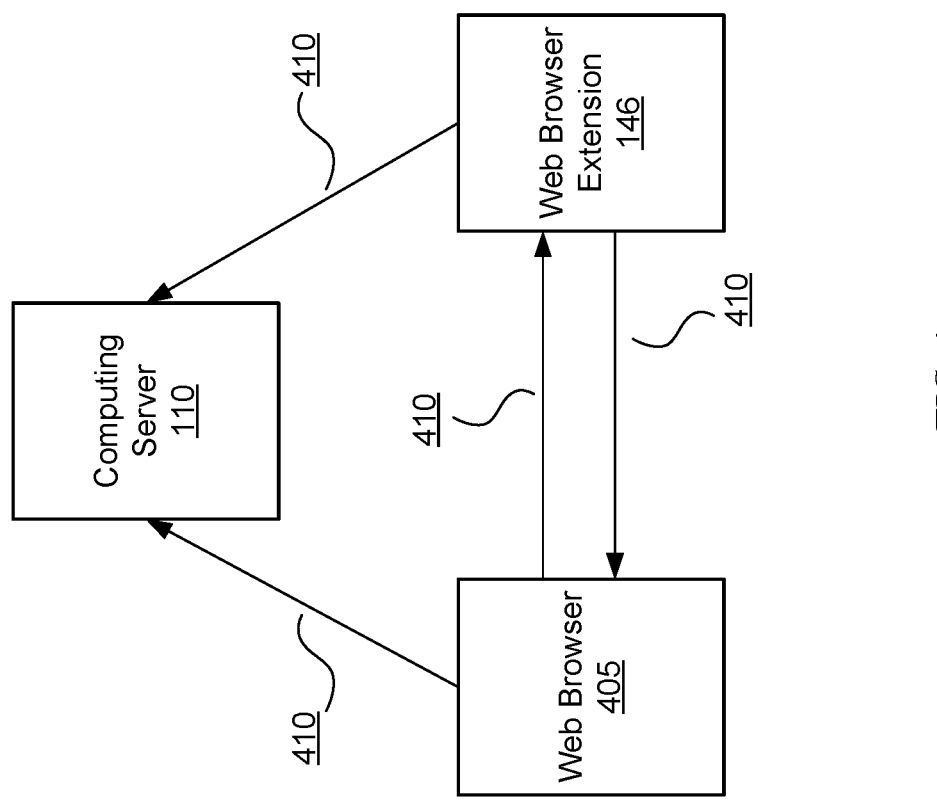
FIG. 4 illustrates communications between a web browser, a web browser extension, and a computing server, in accordance with some embodiments.

A web browser extension 146 is a software application that adds to or changes the functionality of a web browser (e.g., interface 144). The web browser extension 146 may change the way the web browser operates or appears. For example, the web browser extension 146 may block advertisements on a web page, allow a user to create groups of tabs on the web browser, manage cookies, add user interface modifications, or change the style of a web page. The web browser extension 146 may have access to data associated with web pages, for example a web page's HTML and CSS code. The web browser extension 146 may additionally have access to data specific to a user, for example a user's browsing history, tabs, or device location. The web browser extension 146 may make requests to a server, such as computing server 110 or secure server 190, and may modify or reject requests the web browser is making. Further details of the communication between the web browser, the web browser extension 146, and the computing server 110 are shown in FIG. 4.

The web browser extension 146 may additionally or alternatively provide functionality to the web browser that allows end users to engage in a transaction with a named entity using an account associated with the end user transaction device 130. For example, the web browser extension 146 may allow end users to view a card number associated with the end user transaction device 130, view spending control rules and restrictions imposed on the end user transaction device 130, complete a transaction with a named entity using the end user transaction device 130, and capture or submit a documentation record associated with a transaction. In various embodiments, the web browser extension 146 may be in communication with one or more components of the computing server 110, such as a client profile management engine 210, an account management engine 220, a named entity identification engine 230, a transaction matching engine 240, a matching model 245, and a phishing alert engine 260. In some embodiments, the web browser extension 146 may also perform one or more functions described in those engines of the computing server 110.

In some embodiments, the client device 140 and the end user transaction device 130 belong to the same domain. For example, a company client can request the computing server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 150 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACE-BOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 150 may take different forms. For example, if an electronic fund transfer is a credit card payment, the transaction terminal 150 can be a physical device such as a point of sale (POS) terminal (e.g., a card terminal) or can be a website for online orders. An ATM, a bank website, a peer-to-peer mobile application, and an instant messaging application can also be examples of a transaction terminal 150. The third party is a transferor or transferee of the fund transfer. For example, in a card transaction, the third party may be a named entity (e.g., a merchant). In an electronic fund transfer such as a card payment for a merchant, the transaction terminal 150 may generate a transaction data payload that carries information related to the end user transaction device 130, the merchant, and the transaction. The transaction data payload is transmitted to other parties, such as credit card companies or banks, for approval or denial of the transaction.

A third-party named entity 170 may be a third party that conducts transaction with a client of the computing server 110. Third party may be viewed from the perspective of the computing server 110. A named entity may be an identifiable real-world entity. For example, a specific merchant may be a named entity that provides goods or services for purchase by a user using the end user transaction device 130, such as in the situation where an employee uses a virtual credit card issued by the computing server 110 on behalf of the employer to make a purchase with a merchant. Another example of a third-party named entity 170 is a bank which conducts transactions with a company that is the client of the computing server 110. In some embodiments, a third-party named entity 170 may be in control of a transaction terminal 150. For example, a retail chain may be in control of its POS system at a store.

In various embodiments, a third-party named entity 170 may automatically generate a documentation record to document an occurred transaction. The documentation record, which may also simply be referred to as a record, may be generated by the transaction terminal 150 or a server of the named entity. A documentation record serves as a record of a transaction between a named entity and an end user. For example, after a purchase using a POS terminal, the terminal (which broadly may mean the terminal itself or the server of the terminal) may automatically generate a paper or an electronic receipt (e.g., an email receipt) for the customer. A documentation record can include the name of the named entity, a location at which the transaction occurred, a time at which the transaction occurred, an amount which was exchanged during the transaction (e.g., an amount of currency), an itemized list of goods or services purchased, a whole or portion of an identifier of the end user transaction device 130 (e.g., the last four digits of a credit card number), any suitable data describing the transaction, or a combination thereof. The transaction terminal 150 may provide the generated documentation record to the end user transaction device 130, a computing device of the end user (e.g., a laptop computer of the end user), the computing server 110, the secure server 190, or a combination thereof. In some embodiments, the documentation record may be included within the transaction data payload. The documentation record may take various forms, including a paper receipt, a digital image of a paper receipt, an email, a short message service (SMS) text, a Quick Response (QR) code, a physical invoice, an electronic invoice, a statement, or any suitable form for providing data describing a transaction to the end user, the computing server 110, or the secure server 190. The documentation record may be an electronic receipt automatically sent from the third-party named entity 170 in response to the occurrence of a real-time transaction.

The third-party server 180 may include one or more computers that perform various tasks related to receiving automatically generated documentation records from the transaction terminal 150 and transmitting communication payloads to the computing server 110 or the secure server 190. A third-party may operate the third-party server 180. In some embodiments, the third-party that operates the third-party server 180 may be the third-party named entity 170. In some embodiments, the third-party that operates the third-party server 180 may be a third-party unrelated to the third-party named entity 170.

The secure server 190 is a computing server that may have a heightened security standard and an isolated environment for connecting with the third-party server 180 and reviewing data from the third-party server 180 that may include personally identifiable information or other sensitive information. In some embodiments, the secure server 190 may receive data from the third-party server 180 directly or from another party such as a mailbox provider of the organization associated with the third-party server 180. The secure server 190 may establish a connection with a mailbox provider to receive message data such as the email data of the organization. The extent of information received by secure server 190 may depend on an agreement between organization and the secure server 190. For example, in some embodiments, the secure server 190 may receive only certain header fields of the message data. In other embodiments, the secure server 190 may receive the entire headers of the message data. In other embodiments, the secure server 190 may receive the body of the messages such as the content of the emails. In other embodiments, the secure server 190 may also receive reports such as message management reports that may or may not contain some or all of the content of the messages. The secure server 190 may analyze the message data and filter the data before the outputs of the secure server 190 are sent to the computing server 110.

In some embodiments, the secure server 190 may communicate with the third-party server 180 via various suitable ways. In some embodiments, an application programming interface (API) allows the secure server 190 to inspect some of the messages, such as emails, directed to or in transit in the third-party server 180. In some embodiments, the API may provide access to the secure server 190 for all contents of the messages or for only part of the data of the messages. In some embodiments, the secure server 190 may include in-line processing of emails.

In some embodiments, the computing server 110 may automatically match documentation records that are generated by a third-party named entity 170 in transactions between various end users and the third-party named entity 170 to the transactions. An organization client may delegate the computing server 110 to manage and approve real-time transactions that involve the use of end user transaction devices 130 of the organization with various third-party named entities 170 (e.g., various merchants). The computing server 110, upon reviewing and approving a transaction in real time, retains a record of the transaction. On the other hand, the third-party named entity 170 may separately generate a documentation record (e.g., an e-receipt) for the transaction. The third-party named entity 170 may transmit the documentation record to the third-party server 180. In turn, the computing server 110, whether directly or through the secure server 190 first filtering the data, may obtain data from the third-party server 180. The computing server 110 automatically identify the documentation record and match the documentation to the transaction that was approved the computing server 110.

Various servers in this disclosure may take different forms. In some embodiments, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In some embodiments, a server includes one or more virtualization instances such as a container, a virtual machine, a virtual private server, a virtual kernel, or another suitable virtualization instance.

The network 195 provides connections to the components of the system environment 100 through one or more sub-networks, which may include any combination of local area and/or wide area networks, using both wired and/or wireless communication systems. In some embodiments, a network 195 uses standard communications technologies and/or protocols. For example, a network 195 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 195 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 195 may be represented using any suitable format, such as hypertext markup language (HTML), extensible markup language (XML), JavaScript object notation (JSON), structured query language (SQL). In some embodiments, some of the communication links of a network 195 may be encrypted using any suitable technique or techniques such as secure sockets layer (SSL), transport layer security (TLS), virtual private networks (VPNs), Internet Protocol security (IPsec), etc. The network 195 also includes links and packet switching networks such as the Internet. In some embodiments, a data store belongs to part of the internal computing system of a server (e.g., the data store 120 may be part of the computing server 110). In such cases, the network 195 may be a local network that enables the server to communicate with the rest of the components.

Example Server Components

Figure 2:
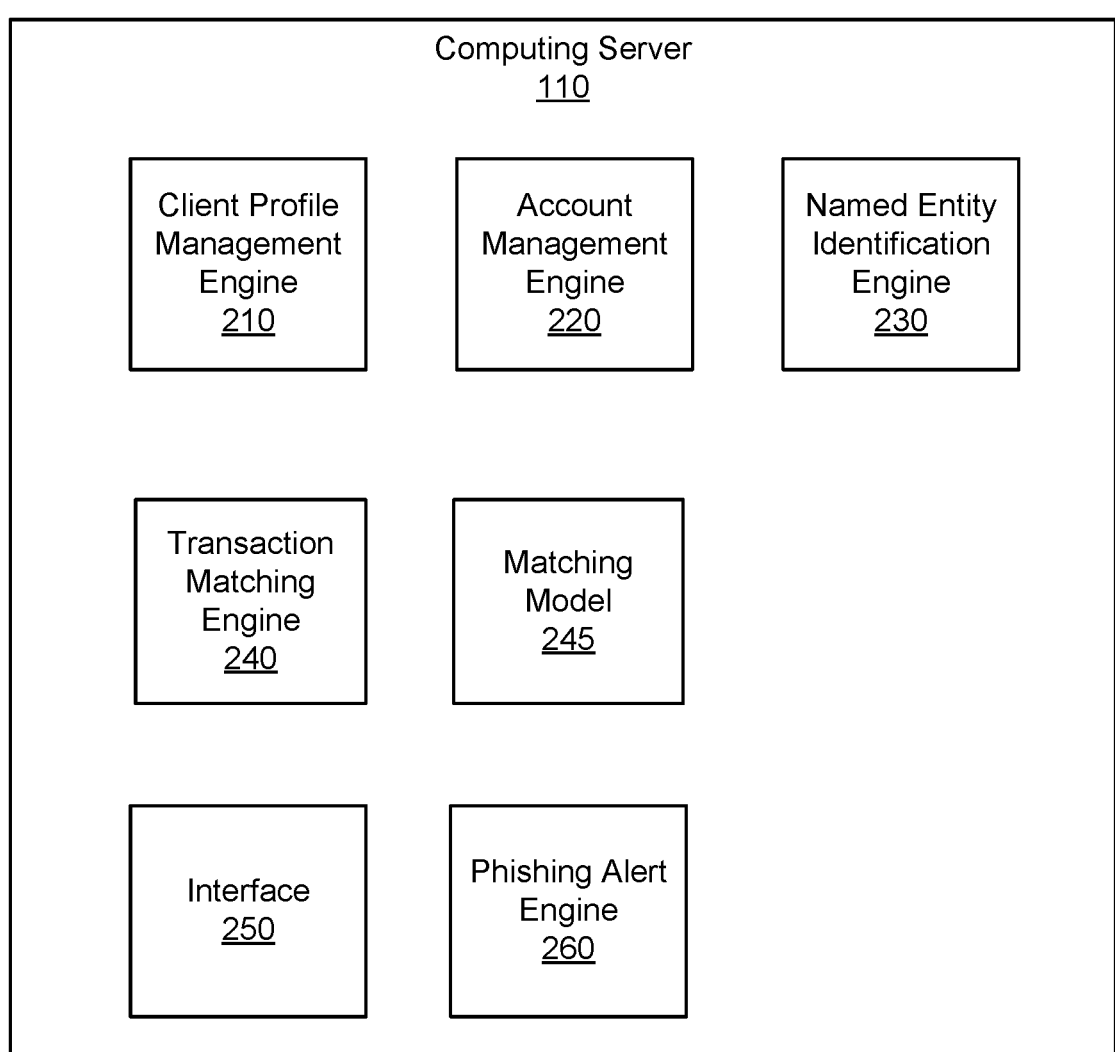
FIG. 2 is a block diagram illustrating components of an example computing server and an example secure server, in accordance with some embodiments.

FIG. 2 is a block diagram illustrating components of a computing server 110, in accordance with some embodiments. In some embodiments, the computing server 110 includes a client profile management engine 210, an account management engine 220, a named entity identification engine 230, a transaction matching engine 240, a matching model 245, an interface 250, and a phishing alert engine 260. In various embodiments, the computing server 110 may include fewer or additional components. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors). In some embodiments, the engines and functionality of the computing server 110 may in whole or in part be implemented in the web browser extension 146. For example, the phishing alert engine 260 could be wholly or partially implemented on the computing server 110, in the web browser extension 146, or in a combination of the two. Other functionalities of the computing server 110 may also be partially implemented on the web browser extension 146. For example, the web browser extension 146 may serve as a component that is in communication with the computing server 110 to implement some functionalities in the web browser automatically based on an end user's authorization and selection. In some embodiments, one or more features performed by the web browser extension 146 may be performed by the computing server 110.

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of a client to determine the administrative privilege of an employee in creating a transaction card account and in setting transaction and record verification rules. An administrator of the client may specify that certain employees from, for example, the financial department and managers have the administrative privilege to create cards for other employees. The client profile management engine 210 assigns metadata tags to transaction data of an organization to categorize the transactions in various ways, such as by transaction types, by merchants, by date, by amount, by card, by employee groups, etc. The client profile management engine 210 can monitor the spending of a client by category and also by the total spending. The spending amounts may affect the results of transaction and record verification rules that are specified by a client's system administrator. For example, a client may limit the total monthly spending of an employee group. The computing server 110 may deny further card payments after the total spending exceeds the monthly budget.

The transaction data stored by the client profile management engine 210 can include a record of a transaction, where the record includes data such as an amount of the transaction, the date of the transaction, a named entity that accepted a request by the end user to initiate the transaction (e.g., the merchant that accepted an end user's request to purchase the merchant's service), or combination thereof. The transaction data may be generated from various sources. For example, in some cases, the computing server 110 approves real-time transactions (e.g., credit card transactions) on behalf of an organization client. As such, an entry of the transaction is created as the computing server 110 approves the real-time transaction. In some cases, the computing server 110 may receive data in bulk from a third-party server 180 and the computing server 110 may parse the data to search for relevant transaction data. In yet other cases, the computing server 110 may receive transactions data from other platforms or software such as an accounting platform, a bank, etc.

The client profile management engine 210 may store the data in a suitable data structure. For example, for transaction data that are received from third-party server 180 (whether directly or via a filtering from the secure server 190), the client profile management engine 210 may store the record as provided by the secure server 190 or the third-party server 180. In some embodiments, the client profile management engine 210 may store emailed receipts as provided by the secure server 190 or the third-party server 180. In some embodiments, the data from the third-party server 180 may be unstructured such as data included in communications like emails. The client profile management engine 210 may parse the substance of the data and turn the data into structured transaction data.

The account management engine 220 creates and manages accounts including payment accounts such as transaction cards that are issued by the computing server 110. An account is associated with an end user such as an employee and corresponds to an end user transaction device 130 (e.g., end user transaction device 130 can be a physical card or a virtual credit card). A client may use the computing server 110 to issue domain-specific payment accounts such as company cards. The client enters account information such as the cardholder's name, role, and job title of the cardholder in the client's organization, limits of the card, and transaction rules associated with the card. The client may use the client device 140 and the interface 144 to supply this information to the computing server 110. In response to receiving the account information (e.g., from the client device 140), the account management engine 220 creates the card serial number, credentials, a unique card identifier, and other information needed for the generation of a payment account and corresponding card. The account management engine 220 associates the information with the cardholder's identifier. The computing server 110 communicates with a transaction card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110.

A transaction rule may govern how a transaction may be handled during the approval process and/or after the transaction. For example, the cards and payment accounts created are associated with the transaction and documentation record verification rules that are specified by the client's administrator. An organization client may specify one or more selection criteria that certain transaction will need to be verified. Verification may be performed by matching the transaction with a documentation record such as a receipt. As discussed in further detail below, to reduce the burden on the employee or the administrator in verifying the transaction, the computing server 110 may automatically find a documentation record and match the record with the transaction, using various processes discussed below.

In some embodiments, the account management engine 220 creates rules for matching records to transactions. A client may specify rules under which records are to be matched to transactions by the computing server 110. The client may use the interface 144 of the client device 140 to specify the rules. The rules may include a location, time, named entity, end user, account, amount (e.g., purchase amount), or any suitable parameter related to a transaction. In one example of a rule, the client specifies that a documentation record is not required to be matched to a transaction for transaction amounts below 75 dollars for merchants in a travel category. In another example of a rule, the client specifies that a documentation record is required to be matched to a transaction for transactions made outside of the United States. The client may specify priority for rules such that a certain rule may override another rule. For example, the account management engine 220 may determine that, under the previous two examples of rules, the client has specified that rules for requiring record matching overrides rules for not requiring matching and cause the transaction matching engine 240 to match a documentation record to a transaction for, for example, a transaction made for a train ticket in Europe using an end user transaction device issued for an end user of the client.

Upon determining that matching is or is not needed using the rules created by the account management engine 220, the transaction matching engine 240 may annotate a record of the transaction with an indicator for the corresponding matching requirement (e.g., matching needed or not needed). This indicator may be used when generating a user interface for the client when managing matching statuses of past transactions Additionally, the indicator may be used to generate notifications to end users to notify the end users of the rules under which a documentation record is not necessary, which may prevent subsequent upload of records and save communication bandwidth and server storage resources. A client may establish such rules through an interface generated by the interface 250.

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transaction. In some embodiments, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with payloads of a particular named entity. The named entity identification rule may specify, for example, the location of a string, the prefix or suffix to removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads.

U.S. patent application Ser. No. 17/351,120, entitled "Real-time Named Entity Based Transaction Approval" and filed on Jun. 17, 2021, is incorporated in its entirety herein for all purposes.

The transaction matching engine 240 matches a documentation record that may be generated by a third-party named entity 170 with a transaction stored in the computing server 110, such as a transaction made using an end user transaction device 130. The transaction matching engine 240 receives data from the secure server 190 or from the third-party server 180. The data may include one or more documentation records that are mixed with other information such as irrelevant communication. The data may be transmitted to the computing server 110 in bulk such as in a communication payload that includes a collection of communications, which can be a collection of emails, collections of receipts that may or may not be relevant, or in other forms. The transaction matching engine 240 may in turn identify the relevant documentation record, parse the relevant information, and match the documentation record with a transaction stored in the computing server 110. For example, where the documentation record is a receipt inside of a communication payload that includes a number of emails associated with an employee, the computing server 110 may search for data associated with the record, such as the timestamp of the email or the sender of the email, even though this data may not be directly located in the documentation record itself. The transaction matching engine 240 may receive the documentation record unprompted (e.g., documentation record may be transmitted from third-party server 180 through push mechanisms such as webhook) or as a result of a request made to the secure server 190 or the third-party server 180. Requests may be initiated by the computing server 110, manually by an administrator or automatically. Requests may be initiated periodically, or may be initiated in response to other stimuli, for example when the computing server receives a transaction that fits the matching criteria selected by the organization client.

The transaction matching engine 240 may process the documentation record. Processing the documentation record may include extracting attributes from the documentation record, wherein an attribute includes data or metadata associated with the documentation record. For example, when the documentation record documents a transaction between an end user and a merchant, attributes may include the date of the transaction, the amount transacted, the name of the merchant, or personal data about the end user, such as the end user's credit card information. When the documentation record is included an email, attributes may be included in various header fields (e.g., the "To" field, the "From" field, the "Subject" field), the body, hidden text, attachments, timing data, or any other data commonly found in emails.

The transaction matching engine 240 may perform different methods of attribute extraction depending on the medium in which the documentation record is provided or depending on the server it receives the documentation record from. For example, a documentation record received from the third-party server 180 may contain known attributes, such as the identity of the named entity, which may allow the transaction matching engine 240 to extract fewer attributes overall from the record. The transaction matching engine 240 may extract attributes using a text search method or natural language processing.

The transaction matching engine 240 may match a documentation record to a past transaction. The transaction matching engine 240 may identify a set of candidate past transactions to match the documentation record to. A set of candidate past transactions may include transactions with timestamps within a time window corresponding to a timing record included in the documentation record. For example, if a documentation record contains timing data that suggests it was created on October 5$^{th}$ at 10:32 am EST, candidate transactions may be transactions with timestamps on October 5$^{th}$, or, more granularly, timestamps on October 5$^{th}$ from 9:32 am EST to 11:32 am EST, for example. The transaction matching engine 240 may determine a match between a documentation record and a candidate past transaction by matching attributes extracted from the documentation record to transaction metadata. For example, where the documentation record is an electronic receipt, the transaction matching engine 240 may identify candidate transactions by identifying a message header in the electronic receipt, determining, using the message header, that the electronic receipt was transmitted from an automated system associated with a particular third-party named entity to an electronic address of an end user, and identifying a set of candidate transactions incurred between a plurality of third-party named entities and the transaction account associated with the electronic address.

In various embodiments, matching may be performed using various algorithms, rules, and other criteria. For example, certain fields may require a closer match (or even an exact match) while other fields may be matched more loosely. In some embodiments, matching may also be performed using scoring of the matching information in various fields. For example, a match between a documentation record and a transaction may be determined by a match between the record's and the transaction's respective amounts, named entities (e.g., merchants), dates, or any suitable data related to a transaction that is recorded or reported in the execution of a transaction (e.g., by the transaction terminal 150). The transaction matching engine 240 may assign weights to the attributes that match the metadata of one of the unverified transactions and sum the weighted attributes to generate a score. The transaction matching engine 240 may compare the generated score to a threshold score and determine a match if the generated score exceeds the threshold score. A client may specify the threshold score value to the computing server 110 (e.g., via the interface 144). The transaction matching engine 240 may stipulate that one of the attributes be an exact match in order for the record to match the transaction. The transaction matching engine 240 may alternatively or additionally stipulate that if some attributes do not match, the record is not a match with the transaction.

The transaction matching engine 240 may apply the matching model 245 to a documentation record and one or more past transactions to determine if the record matches a past transaction. The matching model 245 receives, as input, a processed or unprocessed documentation record or representation thereof (e.g., a feature vector where values of the vector are related to the documentation record) and one or more past transactions. The matching model 245 determines, as output, a match between a documentation record and a past transaction. The matching model 245 may output a level of confidence associated with the match. The matching model 245 may include a ruled based algorithm, such as a heuristic algorithm, a decision tree, or a machine learning model.

The matching model 245 may include one or more machine learning models that are trained to recognize text and natural language. One or more machine learning models may also be trained to identify relevant fields in a documentation record or past transaction, such as the date, the merchant name, and the transaction amount. One or more machine learning models may also be trained to recognize named entities.

The interface 250 includes interfaces that are used to communicate with different parties and servers. For example, the interface 250 may display that a documentation record is automatically found by the computing server 110 for a particular transaction and mark the transaction as verified. The interface 250 may take the form of a SaaS platform that provides clients with access of various functionalities provided by the computing server 110. The interface 250 provides a portal in the form of a graphical user interface (GUI) for clients to create payment accounts, manage transactions, specify rules of each card, and verify records of transactions incurred using the cards. The interface 250 is in communication with the application 142 and provides data to render the application 142.

In some embodiments, the interface 250 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of verifying records, and other functionalities of the various engines 210, 220, 230, and 240 or model 245 may be changed by the clients through sending commands to the API.

The phishing alert engine 260 determines if an unverified web page is a phishing site of a verified web page. A verified web page is a web page that is part of network 195 (e.g., front-end interface 144 of application 142) or is known to the computing server 110 as a trusted web page. A trusted web page may be the website operated by the computing server 110, a partner site, or a web page that the computing server 110 has previously determined to not be a phishing site. An unverified web page is a web page that is neither part of network 195 nor known to the computing server 110 as a trusted web page.

Both verified and unverified web pages have code that contains rules for how content on the web page should appear, for example HyperText Markup Language (HTML) or Cascading Style Sheet (CSS) code. A section of a web page's code that contains one or more rules for how the content should appear may be referred to as a style sheet element. A style sheet element may be one of three types: inline CSS, internal CSS, or external CSS. A style sheet element of the inline type may include CSS directives inside an HTML element that are used to style the HTML element. For example, a style sheet element of the inline CSS type may be "color: yellow; font-size: 25px;" within the HTML paragraph element <p style="color: yellow; font-size: 25px; ">Let's go fishing!<\p>. The style sheet element controls how the paragraph text "Let's go fishing!" appears. A style sheet element of the internal CSS type may include CSS directives inside an HTML head element or elsewhere on the HTML document. For example, a style sheet element of the internal type may be ".carpclass {color: yellow; font-size: 25px;}" inside the HTML head element, <head><style>.carpclass {color: yellow; font-size: 25px; }<\style> <\head>. The style sheet element controls how the text appears inside elements where the class is "carpclass". A style sheet element of the external CSS type may include CSS directives in an external stylesheet that is linked in the HTML of the web page. For example, the web page may include HTML with the head element <head><link rel="stylesheet" href="salmonstyle.css"><\head>. In this case, the external stylesheet would be "salmonstyle.css". In this example, the style sheet element of the external CSS type may be a style sheet element located inside the "salmonstyle.css" file, such as a snippet of internal CSS.

While style sheet elements contain rules for how the content on the web page should appear, not every part of the style sheet element affects how the content appears. For example, in the style sheet element ".carpclass {color: yellow; font-size: 25px;}" if "yellow" were to instead be "green," the text inside elements where the class is "carpclass" would be the color green. Thus, the appearance of the content on the web page would be different. However, if "carpclass" were to have a different name, say "codclass", the appearance of the content on the web page would not change. A part of a style sheet element that affects how the content appears may herein be referred to as a "visual" part of a style sheet element, and a part of a style sheet element that does not affect how the content appears may herein be referred to as a "non-visual" part of a style sheet element. For instance, in the above example, "yellow" is a visual part of the style sheet element and "carpclass" is a non-visual part of the style sheet element. In some embodiments, the verified web page includes one or more style sheet elements that contain non-visual parts that are present in the verified web page. Non-visual parts may include identifiers, such as class and object identifiers, comments in the code, and other elements that are not rendered by the browser as visual part.

A phishing site is an unverified web page that may attempt to acquire sensitive data (e.g., account information) from a user who believes the phishing site to be the verified web page. The phishing site may be made to resemble a verified web page, looking similar to or exactly like the verified web page. In some embodiments, the phishing site may be created by copying some or all of the HTML or CSS code (and as follows, the style sheet elements) corresponding to the verified web page. The phishing site may have a similar domain name or web address to the verified web page. The web address of the phishing site may include part of a string of a web address of the verified web page. For example, if the verified web page has the web address "https://going-fishing.com," the phishing site may have the web address "https://gonefishing.com". Further details of the method of determining if an unverified web page is a phishing site of a verified web page are discussed in FIG. 3.

Phishing Detection Process

Figure 3:
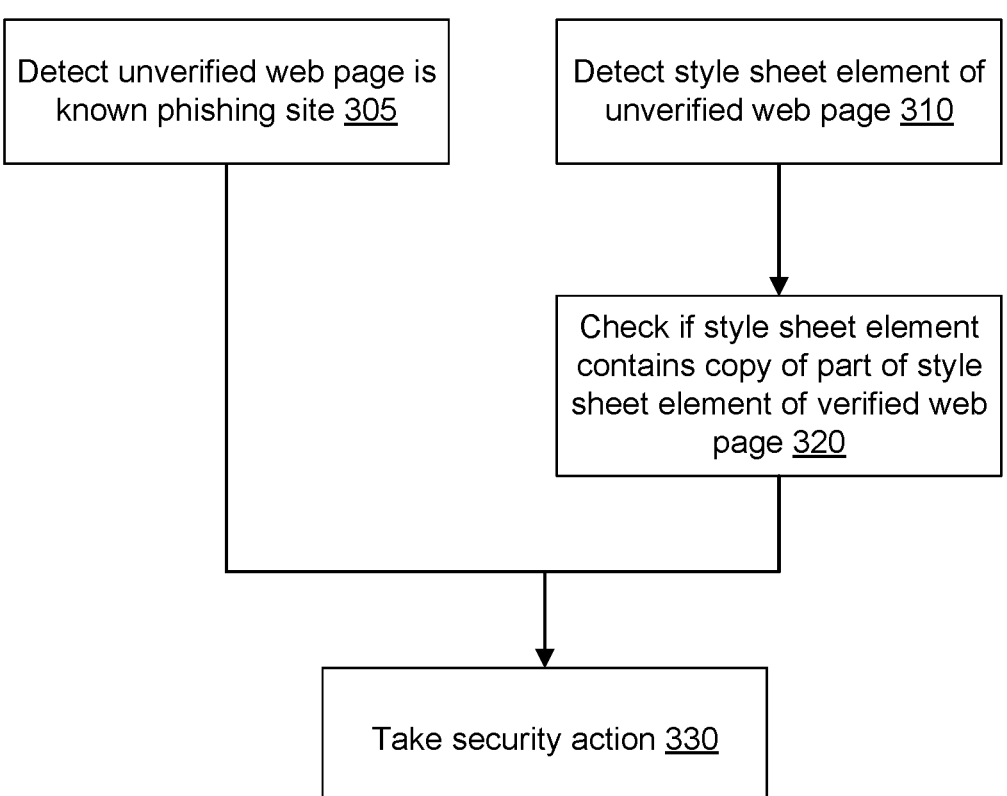
FIG. 3 is a flowchart for a method of determining if an unverified web page is a phishing site of a verified web page, in accordance with some embodiments.

FIG. 3 is a flowchart for a method of determining if an unverified web page is a phishing site of a verified web page. While the steps in process 300 are illustrated graphically in FIG. 3 as sequences of steps, some of the steps may occur in different sequences than illustrated or may occur concurrently with other steps. Also, while the process 300 is depicted as a single series, in various embodiments and situations a process may be further broken down into multiple series.

The computing server 110 or the web browser extension 146 may determine if an unverified web page is a phishing site of a verified web page. The computing server 110 or the web browser extension 146 may make this determination through detecting that the unverified web page is a known phishing site (steps 305, 330 of process 300) or through detecting that a style sheet element of the unverified web page contains a copy of the part of a style sheet element present in the verified web page (steps 310, 320, 330 of process 300). An unverified web page is a web page that is accessed by a user. The unverified web page's web address may include part of a string of a web address of a verified web page. A known phishing site is a phishing site that is known to the computing server 110 or the web browser extension 146 as an untrusted web page. In some embodiments, the computing server 110 or the web browser extension 146 may perform one method of detecting without the other. In some embodiments, the computing server 110 or the web browser extension 146 may perform both methods of detecting. In some embodiments, the computing server 110 or the web browser extension 146 may detect in response to a user accessing the unverified web page.

The computing server 110 or the web browser extension 146 may detect 305 if the unverified web page is a known phishing site. The computing server 110 or the web browser extension 146 may maintain a database of known phishing sites or other sites that may be potentially risky to visit. The computing server 110 or the web browser extension 146 may detect if the unverified web page is a known phishing site by comparing the web address of the unverified web page to a set of denylisted web addresses. In the case of the computing server 110, the computing server 110 may receive the web address of the unverified web page from the web browser extension 146 and may check the web address against the denylisted set of web addresses stored in the database on the computing server 110. In the case of the web browser extension 146, the web browser extension 146 may periodically receive or download the denylist from the computing server 110 and may check the web address against the locally stored set of denylisted web addresses. If the web address of the unverified web page is in the set of denylisted web addresses, the computing server 110 or the web browser extension 146 may determine that the unverified web page is a known phishing site. The computing server 110 or the web browser extension 146 may alternatively or additionally detect if the web address of the unverified web page is on an allowlist. If the web address of the unverified web page is in the set of allowlisted web addresses, the computing server 110 or the web browser extension 146 may determine that the unverified web page is not a phishing site.

The computing server 110 may detect 310 a style sheet element of an unverified web page using the web browser extension 146. In response to the user accessing the web page, a web browser (e.g., interface 144) may make a request for the data (e.g., HTML and CSS code) required to render the web page for the user. The computing server 110 uses the web browser extension 146 to access the unverified web page's code. Using the web browser extension 146 allows the computing server 110 to access the code without needing the ability to request the web browser directly. The web browser extension 146 may request the web browser for the web page's code. Responsive to receiving the web page's code, the web browser extension 146 may transmit the code to the computing server 110 for further processing or analysis. Further details of the communication between the web browser, the web browser extension 146, and the computing server 110 are shown in FIG. 4.

The computing server 110 may use the web browser extension 146 to access the unverified web page's code when an end user visits a site. The unverified web page's code may be retrieved by the web browser extension 146 at any point during a visit, such as after the rendering of the unverified web page. Additionally or alternatively, the web browser extension 146 may transmit the code to the computing server 110 at any point during or after the rendering of the web page. In some embodiments, the web browser extension 146 may access the code at the start of rendering but wait for rendering to complete before transmitting the code to the computing server 110. Waiting for rendering to complete may include waiting for a particular document object module or HTML element to render.

To detect style sheet elements in the web page's code, the computing server 110 or the web browser extension 146 may scan the code for text indicative of style sheet elements. For example, the web browser extension 146 may identify a style sheet element of the inline CSS type by searching for the text "style=". The web browser extension 146 may identify a style sheet element of the internal CSS type by searching for text that is inside of a "<style>" tag. The web browser extension 146 may identify a style sheet element of the external CSS type element by searching for a file ending in ".css" and looking within the external CSS file for a style sheet element. In some embodiments, the designer of the verified web page may use certain names as identifiers out of habit, intentionally, or because of any other reasons. The computing server 110 or the web browser extension 146 may directly scan for those elements in the HTML file of the web page that the end user is browsing.

The computing server 110 or the web browser extension 146 checks 320 if any of the detected style sheet elements of the unverified web page contain a copy of a part of a style sheet element present in the verified web page. In some embodiments, the part of the style sheet element present in the verified web page is non-visual, such as the name of a class. The computing server 110 or the web browser extension 146 may check by applying to the style sheet element a matching technique (e.g., a regular expression, direct string comparison, or a cryptographic hash comparison) designed to filter for the part of the style sheet element present in the verified web page. For example, if the part of the style sheet element present in the verified web page is the class name "codclass" and the detected style sheet element from the unverified web page is the snippet of internal CSS ".codclass {color: yellow; font-size: 25px;}", the computing server 110 or the web browser extension 146 may use a regular expression to check if ".codclass {color: yellow; font-size: 25px;}" contains "codclass". If a detected style sheet element contains a copy of a style sheet element present in the verified web page, the unverified web page may be a phishing site attempting to copy the verified web page. In some embodiments, the computing server 110 or web browser extension 146 may produce a confidence level associated with the match. For example, if the detected style sheet element contains a partial copy of a style sheet element present in the verified web page, the computing server 110 or web browser extension 146 may assign the match a lower confidence level than if the detected style sheet element contained an exact copy.

In response to detecting that the unverified web page is a known phishing site or in response to a style sheet element of the unverified web page containing a copy of the part of a style sheet element present in the verified web page, or both, the computing server 110 or the web browser extension 146 may take 330 a security action. The copy of the part of the style sheet element need not be an exact copy. In some embodiments, the computing server 110 or the web browser extension 146 may take a security action even when the match is not exact or has a low confidence level. The computing server 110 or the web browser extension 146 may take a security action by notifying the user that the unverified web page is a phishing site. The computing server 110 or the web browser extension 146 may notify the user by sending a message (e.g., SMS) to the user device of the user or by sending an email to an email account of the user. In some embodiments, the computing server 110 or the web browser extension 146 may notify the user by using the web browser extension 146 to display a pop-up on the unverified web page. The pop-up may take up part or all of the web page and may or may not be able to be closed by the user. More details of this embodiment are illustrated in FIG. 5C. The computing server 110 or the web browser extension 146 may take the security actions of flagging the user as high risk, stopping transactions from the user's account, or reporting the unverified web page to a trusted third party, such as the Federal Trade Commission (FTC). The computing server 110 or the web browser extension 146 may take a security action of storing the information of the unverified web page, such as the web page's address, to be manually verified. The computing server 110 or the web browser extension 146 may take a security action without informing the user. In some embodiments, the computing server 110 or the web browser extension 146 may take more than one security action.

Browser, Browser Extension, and Server Communication

FIG. 4 illustrates communications between a web browser, a web browser extension, and a computing server, in accordance with some embodiments. FIG. 4 illustrates communications between a web browser 405, the web browser extension 146, and the computing server 110. Each of the arrows on the diagram represent a request 410 that may be made between two of the three parties (the web browser 405, the web browser extension 146, or the computing server 110). In the depicted embodiments, both the web browser 405 and the web browser extension 146 may make requests 410 or send data to the computing server 110. While the computing server 110 may respond to these requests, the computing server 110 is unable to initiate any requests to the web browser 405 or the web browser extension 146. In contrast, the web browser 405 and the web browser extension 146 may make and respond to requests 410 between one another.

Web Page Interfaces

Figure 5A:
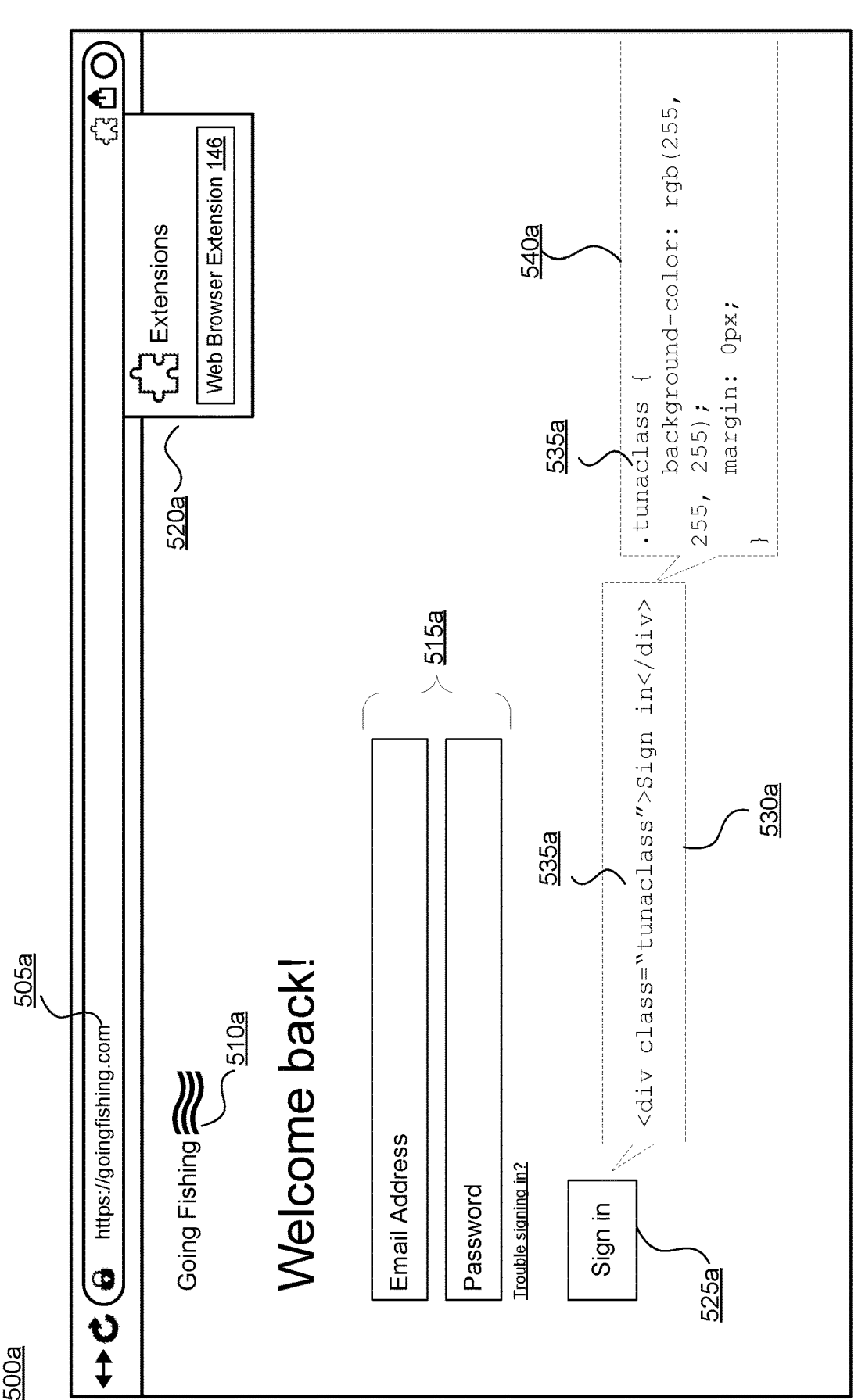
FIGS. 5A-C illustrate example front-end user interfaces for a verified web page, a phishing site, and a web page that a computing server has determined to be a phishing site, in accordance with some embodiments.
Figure 5B:
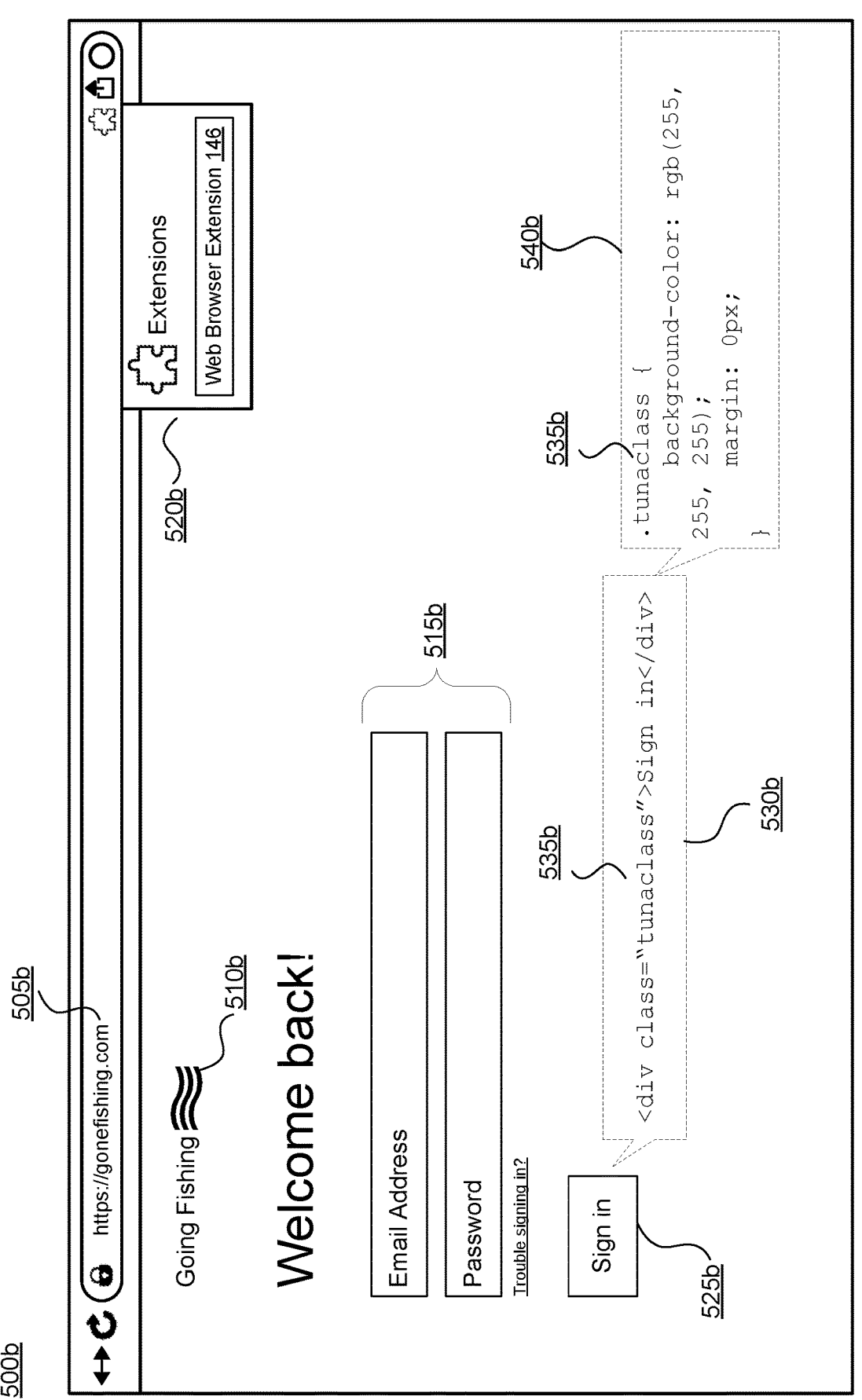
Figure 5C:
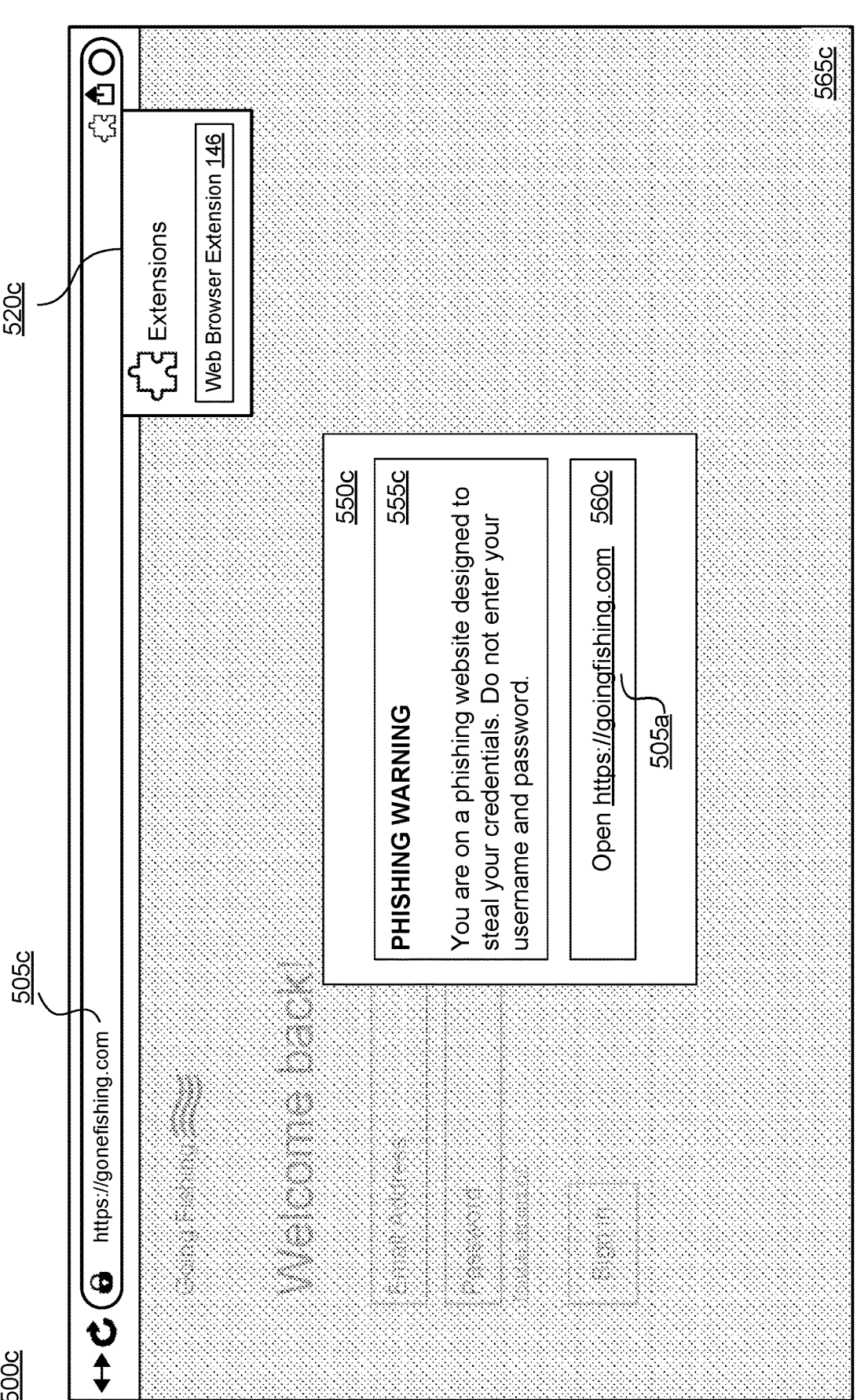

FIGS. 5A-B depict example front-end user interfaces for a verified web page (FIG. 5A) and a phishing site (FIG. 5B). Each of the web pages 500 include a web address 505, a name ("Going Fishing") and logo 510, inputs 515 for a user to enter an email address and password corresponding to a user account, a sign in button 525, and a web browser extension panel 520 which contains the web browser extension 146. FIGS. 5A-B also depict example HTML and CSS code corresponding to the sign in button 525 of the web page 500. The code, shown within dashed line boxes, is not visible to the user in the front-end user interface of the web pages 500 and is shown in the figures for illustrative purposes. The code includes an HTML div element 530, a style sheet element 540 (containing internal CSS code), as well as a part 535 of the style sheet element that is present in the verified web page, the class name "tunaclass".

As shown in FIGS. 5A-B, the web pages 500 are nearly identical. The only difference in appearance between the verified web page 500*a* and the phishing site 500*b* is in the web addresses 505. The verified web page 500*a* includes the web address 505*a*, "https://goingfishing.com", while the phishing site 500*b* includes the slightly different web address 505*b*, "https://gonefishing.com". Moreover, in this example, the code that is invisible to the user (div elements 530, the style sheet elements 540, and the part 535 of the style sheet elements that is present in the verified web page) is identical between the two web pages. This may occur if the phishing site 500*b* has been created by exactly copying the HTML and CSS code of the verified web page 500*a*. In some embodiments, the appearance of the web pages 500 may be less similar, for example including differences in format, colors, text, or images. As such, in these embodiments, the code (530, 535, 540) may only partially match between the two web pages. In the example embodiment, since the difference between the web addresses is slight, the user may assume that the web address 505*b* is the web address corresponding to the verified web page 500*a* and proceed with entering their account information in inputs 515*b*. In response to the user entering their account information into the inputs 515*b* on phishing site 500*b* and clicking the sign in button 525*b*, the phishing site 500*b* may access sensitive information (e.g., payment information, user demographics) associated with the user's account.

FIG. 5C depicts an example front-end user interface for a web page that the computing server 110 determines to be a phishing site. In the depicted embodiment, the web page 500*c* is the same as the web page 500*b*, with the same web address 505, web browser extension panel 520, etc. Responsive to determining that the web page 500*c* is a phishing site, the computing server 110 takes the security action of notifying the user by using the web browser extension 146 to display a pop-up 550*c* on the web page. The pop-up 550*c* contains a message 555*c* and a link 560*c* to the verified web page 500*a* (with web address 505*a*). The message 555*c* alerts the user that web page 500*c* is a phishing site. The link 560*c*, upon activation from the user, redirects the user to verified site 500*a* (with web address 505*a*). The pop-up 555*c* may take up all or part of the web page 500*c* and may or may not be able to be closed by the user. The pop-up 555*c* may be accompanied by other visual elements. In the depicted embodiment, the pop-up 555*c* takes up part of the web page 500*c*, while the rest of the web page 500*c* is blurred out (see blur 565*c*).

Example Code

Figure 6A:
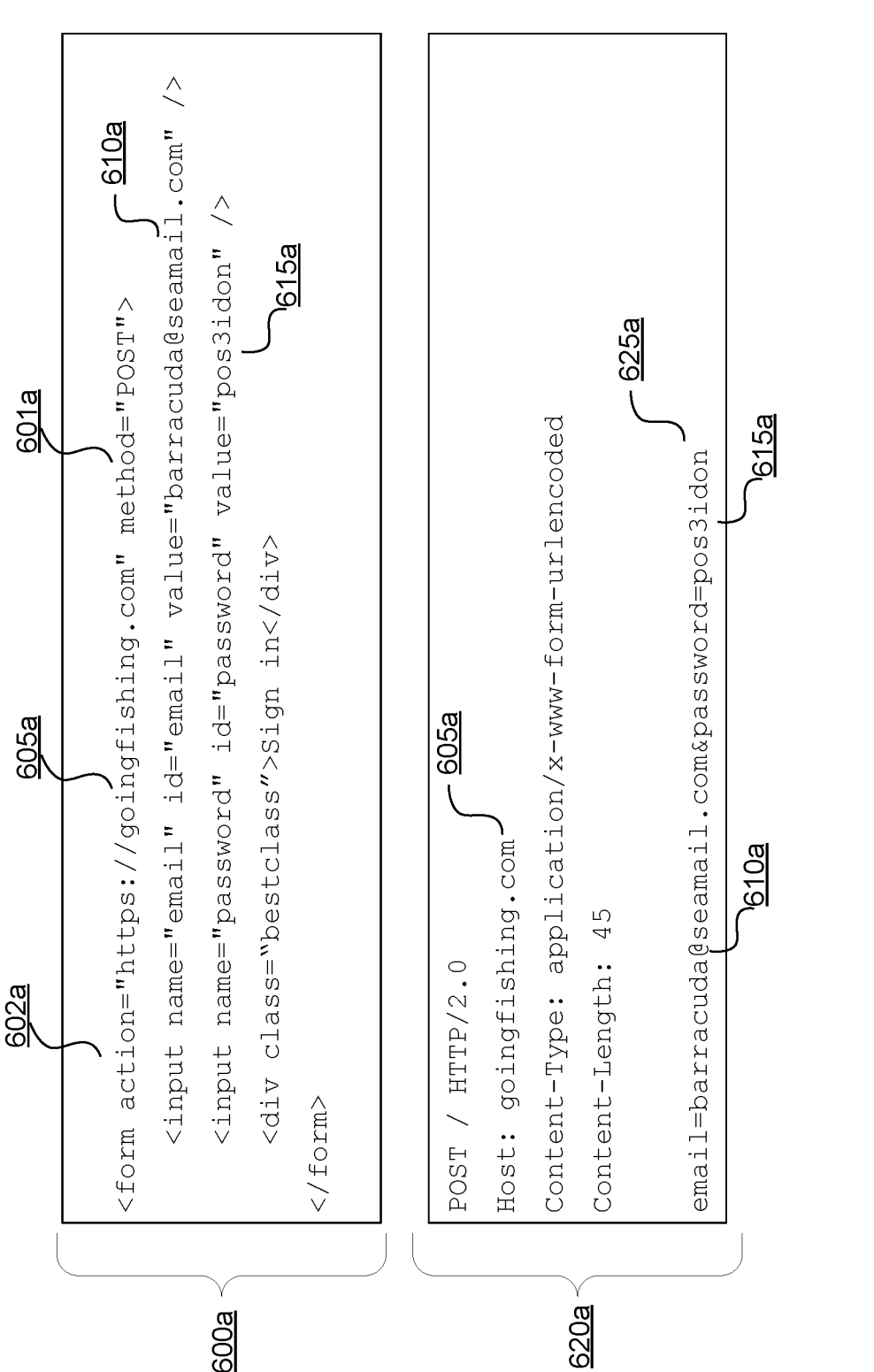
FIGS. 6A-B illustrate example code that a verified web page or phishing site may use to obtain user account information, in accordance with some embodiments.
Figure 6B:
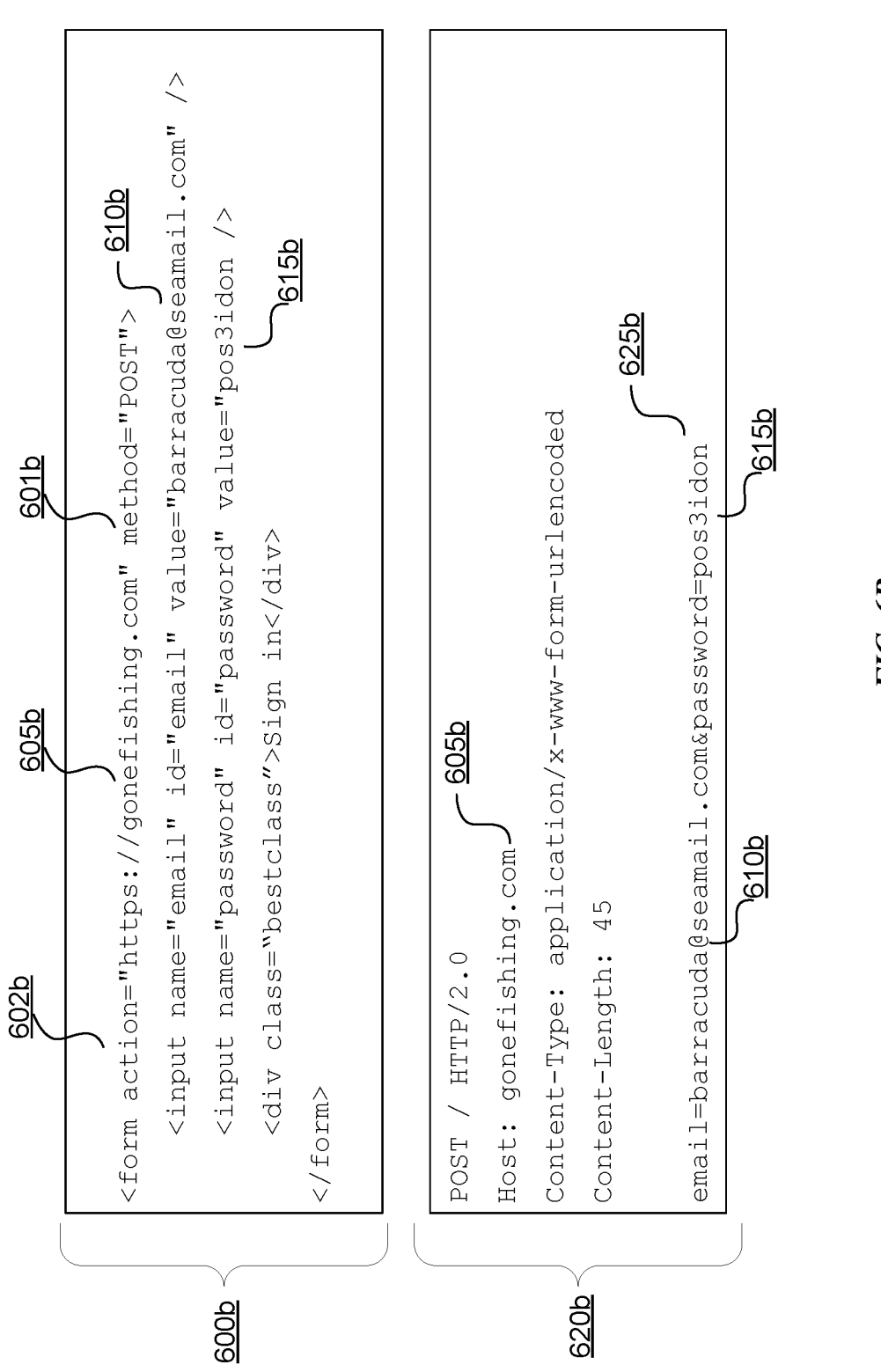

FIGS. 6A-B depict example code that a verified web page (FIG. 6A) or phishing site (FIG. 6B) may use to obtain user account information, in accordance with some embodiments. Each of the figures includes a box showing an HTML form 600 and a box showing a Hypertext Transfer Protocol (HTTP) request 620 that executes when the form 600 is submitted by a user (e.g., user clicks sign in button). The HTML form 600 includes a method attribute 601 which defines how the information submitted through the form is sent. In this example, the form is submitted using a POST method, though in practice other methods may be used. The HTML form 600 includes an action attribute 602 which defines where the information submitted through the form gets sent. In this example, the information gets sent to the URL 605. The HTML form 600 also shows the values that the user typed into the input boxes (see inputs 515 in FIG. 5 for an example). In this example, the user inputted an email 610, "barracuda@seamail.com" and a password 615, "pos3idon". The HTTP request 620 includes a host, the page where the form is hosted (URL 605). The HTTP request also includes a request body 625 that includes the information, including the email 610 and password 615 submitted by the user.

As with FIGS. 5A and 5B, the differences between the code in FIGS. 6A and 6B are slight. In this example, the differences are between the URLs 605 where the information gets sent. In FIG. 6A, the example code that corresponds to the verified web page, the information gets sent to URL 605*a*, "https://goingfishing.com". In FIG. 6B, the example code that corresponds to the phishing site, the information gets sent to URL 605*b*, "https://gonefishing-.com".

In an example phishing attack, the phishing site collects user information through form 602*b*. When the user submits the form (e.g., by clicking on a sign in button) including their email 610*b* and password 615*b*, the HTML request 620*b* executes, sending the user information to URL 605*b*, the address associated with the phishing site. Responsive to receiving the user information, the operator of the phishing site (e.g., a human operator or a computing server) may enter the user information into form 602*a*. The operator of the phishing site may submit the form, causing the HTML request 620*a* to execute, sending the user information to URL 605*a*, allowing the operator of the phishing site to have access to the user's account on the verified web page.

Machine Learning Models

The computing server 110 may use machine learning models to identify relevant documentation records in communication payloads. One or more machine learning models may be part of the identification model 270. The computing server 110 may accumulate a large number of past communication payloads, wherein some communication payloads contain documentation records, and some do not. The computing server 110 may use the past communication payloads as a set of training samples to iteratively train one or more machine learning models that can be used to identify documentation records in communication payloads.

The computing server 110 may use machine learning models to match documentation records with transactions. One or more machine learning models may be part of the matching model 245. The computing server 110 may accumulate a large number of past documentation records and corresponding transaction records as well as documentation records and transaction records that do not have corresponding matches. The computing server 110 may use the past documentation records and transaction records as a set of training samples to iteratively train one or more machine learning models that can be used to match documentation record with transactions.

A training sample may include a label for supervised training. The label may be generated by a manual process or by an automatic process. For example, in training a model that is used to identify a documentation record in a communication payload, the training samples may include past communication records with the presence of a documentation record as labels.

In some embodiments, a machine learning model may also be used to identify the useful fields in a communication payload or a documentation record. In such cases, the labels of training samples may be locations of the fields. In some embodiments, certain common communication payloads or documentation records may have rule-based models to help identifying information. For example, for common large merchants such as chain restaurants, online retailing platforms, large payment POS services, the documentation records of those merchants may follow a standard format. A rule-based model may be used to locate the standard fields in those records. In some cases, part of the training samples includes labels while other training samples do not include labels but are grouped with labeled samples through a process such as clustering and word embeddings.

In various embodiments, a wide variety of machine learning techniques may be used. Examples of which include different forms of unsupervised learning, clustering, embeddings such as word embeddings, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. Each transaction dataset may be converted to a feature vector that includes different dimensions. By way of example, strings in the transaction data may be converted to word embeddings using known techniques Word2Vec or another technique. The word embeddings can be one or more dimensions of the feature vector. Other data fields may be turned into various dimensions of a feature vector representing a transaction data. The feature vectors can be inputted into the machine learning model to iteratively train the machine learning model. A series of transactions may also be converted to a time series.

In various embodiments, the training techniques for iteratively training a machine learning model may be supervised, semi-supervised, or unsupervised. In supervised training, the machine learning algorithms may be trained with a set of training samples that are labeled. For example, a past communication payload can be associated with a label. The labels for each training sample may be binary or multi-class. In some cases, an unsupervised learning technique may be used. The samples used in training are not labeled. Various unsupervised learning techniques such as clustering may be used. In some cases, the training may be semi-supervised with the training set having a mix of labeled samples and unlabeled samples.

A machine learning model is associated with an objective function, which generates a metric value that describes the objective goal of the training process. For example, the training intends to reduce the error rate of the model in generating predictions of the results (whether the result is the presence of a documentation record within a communication payload or a match between a documentation record and a transaction). In such a case, the objective function may monitor the error rate of the machine learning model. In transaction series analysis, the objective function of the machine learning algorithm may be the value different in predicting the recurring frequency in a training set. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the absolute distance between the predicted value and the actual value), L2 loss (e.g., root mean square distance).

A machine learning model includes certain layers, nodes, kernels, and/or coefficients. Training of a machine learning model includes iterations of forward propagation and back-propagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may each also be associated with an activation function that decides the weight of the output of the node in forward propagation. Common activation functions may include step functions, linear functions, sigmoid functions, hyperbolic tangent functions (tanh), and rectified linear unit functions (ReLU). After input is provided into the neural network and passes through a neural network in the forward direction, the results may be compared to the training labels or other values in the training set to determine the neural network's performance. The process of prediction may be repeated for other transactions in the training sets to compute the value of the objective function in a particular training round. In turn, the neural network performs backpropagation by using gradient descent such as stochastic gradient descent (SGD) to adjust the coefficients in various functions to improve the value of the objective function.

Multiple iterations of forward propagation and back-propagation may be performed. Training may be completed when the objective function has become sufficiently stable (e.g., the machine learning model has converged) or after a predetermined number of rounds for a particular set of training samples. Different machine learning models may be trained for different purposes.

Additional Considerations

The general architecture disclosed herein has applications in various areas, such as a payment transaction verification process. For example, in a credit card transaction, the credit card company logs data for the transaction incurred between an end user and a merchant, and the merchant provides a record of the transaction to the end user. This record can be a receipt such as an emailed receipt or a printed receipt. In some embodiments, a computing server verifies the transactions by matching transaction data (e.g., amount of the transaction, date of the transaction, and name of the merchant) provided by the credit card company against the transaction data parsed from a receipt. Instead of prompting the end user to provide the receipt for verification, the computing server can operate on standby until, unprompted, the end user provides the receipt. Thus, the computing server does not expend unnecessary processing and network bandwidth resources to acquire records from end users for verifying transactions.

The foregoing description of the embodiments has been presented for the purpose of illustration: it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method of determining if a web page is a phishing site comprising:
   detecting, with a browser extension, a style sheet element of an unverified web page, wherein the unverified web page is a web page accessed by a user;
   checking if the style sheet element of the unverified web page contains a copy of a part of a style sheet element of a verified web page, the verified web page being a trusted web page that is trusted by the browser extension, wherein the part of the style sheet element of the unverified web page is an identifier in the style sheet element that is invisible in a rendered website but is present also in style sheet elements of the verified web page, wherein the identifier is an anti-phishing identifier that is included to the verified web page to detect any unverified web page copying the style sheet element of the verified web page; and
   responsive to the style sheet element of the unverified web page containing a copy of the part of the style sheet element of the verified web page, taking a security action that includes issuing a notification through the browser extension to the user that the unverified web page is potentially a phishing website.

2. The method of claim 1, wherein a web address of the unverified web page includes part of a string of a web address of the verified web page.

3. The method of claim 1, wherein detecting a style sheet element of an unverified web page comprises continuous detecting the style sheet element with a browser extension.

4. The method of claim 1, further comprising checking if the unverified web page is a known phishing site.

5. The method of claim 4, wherein checking if the unverified web page is a known phishing site comprises comparing the web page to a set of denylisted web pages.

6. The method of claim 1, wherein checking if the style sheet element of the unverified web page contains a copy of a part of a style sheet element of a verified web page comprises applying a matching technique to the style sheet element of the unverified web page, wherein the matching technique is one of a regular expression, a direct string comparison, or a cryptographic hash comparison.

7. The method of claim 1, further comprising, responsive to the style sheet element of the unverified web page containing a copy of the part of the style sheet element of the verified web page, storing a web address of the unverified web page to be manually verified.

8. The method of claim 1, wherein taking a security action comprises notifying the user that the unverified web page is a phishing site, flagging the user as high risk, stopping transactions from an account associated with the user, reporting the unverified web page to a trusted third party, or storing information associated with the unverified web page to be manually verified.

9. A non-transitory computer-readable storage medium configured to store computer code comprising instructions, wherein the instructions, when executed by one or more processors, cause the one or more processors to:

detect, with a browser extension, a style sheet element of an unverified web page, wherein the unverified web page is a web page accessed by a user;

check if the style sheet element of the unverified web page contains a copy of a part of a style sheet element of a verified web page, the verified web page being a trusted web page that is trusted by the browser extension, wherein the part of the style sheet element of the unverified web page is an identifier in the style sheet element that is invisible in a rendered website but is present also in style sheet elements of the verified web page, wherein the identifier is an anti-phishing identifier that is included to the verified web page to detect any unverified web page copying the style sheet element of the verified web page; and responsive to the style sheet element of the unverified web page containing a copy of the part of the style sheet element of the verified web page, take a security action that includes issuing a notification through the browser extension to the user that the unverified web page is potentially a phishing website.

10. The non-transitory computer-readable storage medium of claim 9, wherein a web address of the unverified web page includes part of a string of a web address of the verified web page.

11. The non-transitory computer-readable storage medium of claim 9, wherein the instruction for detecting a style sheet element of an unverified web page comprises instructions that, when executed by the one or more processors, cause the one or more processors to continuously detect the style sheet element with a browser extension.

12. The non-transitory computer-readable storage medium of claim 9, further comprising instructions that, when executed by the one or more processors, cause the one or more processors to check if the unverified web page is a known phishing site.

13. The non-transitory computer-readable storage medium of claim 12, wherein the instruction for checking if the unverified web page is a known phishing site comprises instructions that, when executed by the one or more processors, cause the one or more processors to compare the web page to a set of denylisted web pages.

14. The non-transitory computer-readable storage medium of claim 9, wherein the instruction for checking if the style sheet element of the unverified web page contains a copy of a part of a style sheet element of a verified web page comprises instructions that, when executed by the one or more processors, cause the one or more processors to apply a regular expression to the style sheet element of the unverified web page.

15. The non-transitory computer-readable storage medium of claim 9, further comprising instructions that, when executed by the one or more processors, cause the one or more processors to, responsive to the style sheet element of the unverified web page containing a copy of the part of the style sheet element of the verified web page, store a web address of the unverified web page to be manually verified.

16. The non-transitory computer-readable storage medium of claim 9, wherein the instruction for taking a security action comprises instructions that, when executed by the one or more processors, cause the one or more processors to notify the user that the unverified web page is a phishing site, flag the user as high risk, stop transactions from an account associated with the user, report the unverified web page to a trusted third party, or store information associated with the unverified web page to be manually verified.

17. A system, comprising:

one or more processors and memory, the memory configured to store instructions, wherein the instructions, when executed by the one or more processors, cause the one or more processors to:

detect, with a browser extension, a style sheet element of an unverified web page, wherein the unverified web page is a web page accessed by a user;

check if the style sheet element of the unverified web page contains a copy of a part of a style sheet element of a verified web page, the verified web page being a trusted web page that is trusted by the browser extension, wherein the part of the style sheet element of the unverified web page is an identifier in the style sheet element that is invisible in a rendered website but is present also in style sheet elements of the verified web page, wherein the identifier is an anti-phishing identifier that is included to the verified web page to detect any unverified web page copying the style sheet element of the verified web page; and responsive to the style sheet element of the unverified web page containing a copy of the part of the style sheet element of the verified web page, take a security action that includes issuing a notification through the browser extension to the user that the unverified web page is potentially a phishing website.

18. The system of claim 17, wherein a web address of the unverified web page includes part of a string of a web address of the verified web page.

19. The system of claim 17, wherein the instruction for detecting a style sheet element of an unverified web page comprises instructions that, when executed by the one or more processors, cause the one or more processors to continuously detect with a browser extension.

20. The system of claim 17, further comprising instructions that, when executed by the one or more processors, cause the one or more processors to check if the unverified web page is a known phishing site.

* * * * *